«12» United States Patent
Horng et al.

(10) Patent No.: US 10,927,895 B2
(45) Date of Patent: Feb. 23, 2021

(54) DUSTPROOF BEARING ASSEMBLY AND MOTOR INCLUDING THE SAME

(71) Applicant: Sunonwealth Electric Machine Industry Co., Ltd., Kaohsiung (TW)

(72) Inventors: Alex Horng, Kaohsiung (TW); Chia-Wen Kang, Kaohsiung (TW); Yi-Ming Chu, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 462 days.

(21) Appl. No.: 15/852,118

(22) Filed: Dec. 22, 2017

(65) Prior Publication Data

US 2018/0274592 A1    Sep. 27, 2018

(30) Foreign Application Priority Data

Mar. 21, 2017    (TW) .................................. 106109406

(51) Int. Cl.
*F16C 33/72* (2006.01)
*F16C 19/08* (2006.01)
(Continued)

(52) U.S. Cl.
CPC ............ *F16C 33/723* (2013.01); *F16C 19/08* (2013.01); *F16C 19/54* (2013.01);
(Continued)

(58) Field of Classification Search
CPC ........ F16C 19/08; F16C 19/54; F16C 33/723; F16C 33/768; F16C 33/7816;
(Continued)

(56) References Cited

U.S. PATENT DOCUMENTS 5,572,078 A * 11/1996 Saichi .................... H02K 5/124
310/44
5,600,511 A * 2/1997 Dunfield .............. G11B 25/043
360/98.07
(Continued)

FOREIGN PATENT DOCUMENTS

CN        201391489 Y       1/2010
CN        203707950 U       7/2014
(Continued)

*Primary Examiner* — Tulsidas C Patel
*Assistant Examiner* — Rashad H Johnson
(74) *Attorney, Agent, or Firm* — Alan D. Kamrath; Karin L. Williams; Mayer & Williams PC

(57) ABSTRACT

A dustproof bearing assembly includes a base having a shaft tube. The shaft tube has an open end with an opening. At least one bearing is coupled to an inner periphery of the shaft tube. A rotating member includes a shaft seat. A shaft includes a first end coupled to the shaft seat and a second end extending through a shaft-receiving hole of the at least one bearing. A dustproof member includes a lower face and an upper face. The lower face is spaced from the open end of the shaft tube. The dustproof member covers the opening. The upper face of the dustproof member abuts a bottom of the shaft seat. The dustproof member has an outer diameter larger than an inner diameter of the shaft tube. The dustproof bearing assembly can be used in a motor.

33 Claims, 6 Drawing Sheets

(51) Int. Cl.
*H02K 5/16* (2006.01)
*H02K 5/10* (2006.01)
*F16C 19/54* (2006.01)
*F16C 33/78* (2006.01)
*F16C 35/12* (2006.01)
*F16C 33/76* (2006.01)

(52) U.S. Cl.
CPC ...... *F16C 33/7816* (2013.01); *F16C 33/7886* (2013.01); *F16C 35/12* (2013.01); *H02K 5/10* (2013.01); *H02K 5/161* (2013.01); *H02K 5/163* (2013.01); *F16C 33/768* (2013.01); *F16C 2240/70* (2013.01); *F16C 2380/26* (2013.01); *H02K 2213/03* (2013.01)

(58) Field of Classification Search
CPC .. F16C 33/7886; F16C 35/12; F16C 2240/70; F16C 2380/26; H02K 5/10; H02K 5/161; H02K 5/163
USPC ............................ 310/67 A, 88, 89, 90.5, 91
See application file for complete search history.

(56) References Cited

U.S. PATENT DOCUMENTS

| | | | |
|---|---|---|---|
| 7,391,140 B2* | 6/2008 | Horng | F04D 29/059 310/104 |
| 8,047,717 B2* | 11/2011 | Horng | F16C 35/02 384/107 |
| 9,768,651 B2 | 9/2017 | Horng et al. | |
| 10,348,167 B2* | 7/2019 | Yin | F04D 25/068 |
| 2004/0228559 A1* | 11/2004 | Horng | F16C 25/08 384/517 |
| 2005/0140232 A1* | 6/2005 | Lee | H02K 1/2786 310/156.26 |
| 2008/0218018 A1 | 9/2008 | Zhang et al. | |
| 2015/0035401 A1* | 2/2015 | Horng | H02K 5/1675 310/90 |
| 2015/0288237 A1 | 10/2015 | Horng et al. | |

FOREIGN PATENT DOCUMENTS

| | | |
|---|---|---|
| CN | 204696842 U | 10/2015 |
| TW | 201251280 A | 12/2012 |
| TW | I530064 B | 4/2016 |

* cited by examiner

DUSTPROOF BEARING ASSEMBLY AND MOTOR INCLUDING THE SAME

CROSS REFERENCE TO RELATED APPLICATIONS

The application claims the benefit of Taiwan application serial No. 106109406, filed on Mar. 21, 2017, and the entire contents of which are incorporated herein by reference.

BACKGROUND OF THE INVENTION

1. Field of the Invention

The present invention relates to a dustproof bearing assembly and, more particularly, to a dustproof bearing assembly preventing entrance and accumulation of dust in a bearing to avoid non-smooth rotation and rotational noise of the bearing.

2. Description of the Related Art

FIG. 1 illustrates a conventional motor 9 including a base 91 on which a shaft tube 92 is mounted. At least one bearing 93 is mounted in the shaft tube 92 and is of a conventional type including an outer race 93a and an inner race 93b. The outer race 93a is securely fixed to an inner periphery of the shaft tube 92 to prevent rotation therebetween. A shaft 95 of a rotor 94 is coupled in a central hole of the inner race 93b to permit joint rotation of the inner race 93b and the shaft 95. To increase the heat dissipating effect of the motor 9, at least one through-hole 96 is defined in a top portion of a housing of the rotor 94, such that the heat generated during operation of the motor 9 can be dispelled out of the rotor 94 via the at least one through-hole 96.

However, when the motor 9 does not rotate, dust is apt to pass through the at least one through-hole 96 into the rotor 94 or even enter the at least one bearing 93, as indicated by the arrows. After a long period of time, the dust accumulated between the outer race 93a and the inner race 93b causes non-smooth rotation and rotational noise of the balls 93c of the at least one bearing 93, not allowing continued use of the at least one bearing 93.

FIG. 2 shows another conventional motor 8, an example of which is disclosed in U.S. Pat. No. 8,047,717 entitled "Bearing Positioning Structure for Motor." The motor 8 also includes a base 81, a shaft tube 82, at least one bearing 83, a rotor 84, and a shaft 85. An end of the shaft 85 is fixed to a shaft seat 86 of the rotor 84. The motor 8 further includes a dustproof member 87 fixed to an upper end of the shaft tube 82 for covering an upper side of the at least one bearing 83 in an attempt to reduce the amount of dust entering the at least one bearing 83. However, the at least one bearing 83 of the motor 8 is an oily bearing or a self-lubricating bearing. Furthermore, the dustproof member 87 is fixed and cannot rotate relative to the shaft tube 82, and the rotor 84 and the shaft 85 are rotatable relative to the shaft tube 82 and the at least one bearing 83. Thus, the lower surface of the shaft seat 86 and the shaft 85 do not come into contact the dustproof member 87 (see the gap S therebetween). However, dust can still pass through the gap S and can accumulate in a relative rotational portion between the at least one bearing 83 and the shaft 85. After a long period of time of use, the dust accumulated between the shaft 85 and the at least one bearing 83 causes non-smooth rotation of the shaft 85 relative to the at least one bearing 83 and causes rotational noise, not allowing continued use of the at least one bearing 93.

SUMMARY OF THE INVENTION

To solve the above disadvantages, an objective of the present invention is to provide a dustproof bearing assembly effectively preventing dust from entering the bearing to avoid non-smooth rotation of a shaft relative to the bearing and to reduce the rotational noise of the shaft or the bearing, thereby prolonging the service life of the bearing.

Another objective of the present invention is to provide a motor with a better dustproof bearing assembly to avoid non-smooth rotation of the shaft relative to the bearing and to reduce the rotational noise of the shaft or the bearing, thereby prolonging the service life of the motor.

When the terms "up", "down", "top", "bottom", "inner", "outer", "side", and similar terms are used herein, it should be understood that these terms have reference only to the structure shown in the drawings as it would appear to a person viewing the drawings and are utilized only to facilitate describing the invention, rather than restricting the invention.

A dustproof bearing assembly according to the present invention includes a base having a shaft tube. The shaft tube has an open end with an opening. The open end including the opening has an outer diameter and an inner diameter. At least one bearing is coupled to an inner periphery of the shaft tube and has a shaft-receiving hole. A rotating member includes a shaft seat having a bottom. A shaft includes a first end coupled to the shaft seat and a second end extending through the shaft-receiving hole of the at least one bearing. A dustproof member includes a lower face and an upper face. The lower face is spaced from the open end of the shaft tube. The dustproof member covers the opening. The upper face of the dustproof member abuts the bottom of the shaft seat. The dustproof member has an outer diameter larger than the inner diameter of the shaft tube.

A motor according to present invention includes a base having a shaft tube. The shaft tube has an open end with an opening. The open end including the opening has an outer diameter and an inner diameter. At least one bearing is coupled to an inner periphery of the shaft tube and has a shaft-receiving hole. A stator unit is mounted around the shaft tube. A rotating member includes a shaft seat and a permanent magnet. The shaft seat includes a bottom. A shaft includes a first end coupled to the shaft seat and a second end extending through the shaft-receiving hole of the at least one bearing. The permanent magnet is aligned with the stator unit. A dustproof member includes a lower face and an upper face. The lower face is spaced from the open end of the shaft tube. The dustproof member covers the opening. The upper face of the dustproof member abuts the bottom of the shaft seat. The dustproof member has an outer diameter larger than the inner diameter of the shaft tube.

Thus, in the dustproof bearing assembly and the motor including the dustproof bearing assembly according to the present invention, since the dustproof member is coupled by the engaging portion to the shaft without any gaps, since the upper face of the dustproof member abuts or is integrally formed with the bottom of the shaft seat of the rotating member, and since the outer diameter of the dustproof member is larger than the outer diameter of the shaft tube, the opening of the shaft tube is completely covered by the dustproof member to effectively prevent dust from entering the shaft tube and to prevent accumulation of dust in the top portion of the at least one bearing. Thus, the present invention has a better dustproof effect.

In an example, the at least one bearing includes at least one ball bearing having an outer race and an inner race. The dustproof member can abut the inner race to provide the at least one ball bearing with a better positioning effect.

In an example, the at least one bearing includes two bearings securely positioned to the inner periphery of the shaft tube and spaced from each other. The abutting portion of the dustproof member can abut the inner race of an upper one of the two bearings to provide the bearing with a better positioning effect.

In an example, a positioning ring and an elastic element are mounted between the two bearings. The positioning ring includes an upper end abutting a bottom portion of the outer race of an upper one of the two bearings. The elastic element includes a first end abutting a bottom end of the positioning ring. The elastic element further includes a second end abutting a top portion of the outer race of a lower one of the two bearings. Thus, the two bearings are provided with a better positioning effect.

In an example, a restraining member is mounted around the shaft and abuts a bottom portion of the inner race of the lower one of the two bearings. Thus, the shaft is provided with a better restraining effect.

In an example, the rotating member includes a casing, and the shaft seat is formed on the casing to provide a better positioning effect.

In an example, the casing includes at least one heat dissipating hole extending therethrough. Thus, the casing has a better heat dissipating effect.

In an example, the rotating member further includes a housing fixed to the casing, and the at least one heat dissipating hole extends through the casing and the housing. Thus, the casing and the housing have a better heat dissipating effect.

In an example, the bottom of the shaft seat has an outer diameter larger than the inner diameter of the shaft tube. Thus, when the abutting portion of the dustproof member abuts the inner race of the at least one bearing, the at least one bearing is provided with a better positioning effect.

In an example, the dustproof member includes an abutting portion protruding from the lower face, and the abutting portion abuts the top portion of the inner race of the at least one bearing. Thus, the at least one bearing is provided with a better positioning effect.

In an example, the dustproof member includes an abutting portion protruding from the lower face, and the abutting portion abuts the top portion of the inner race of the upper one of the two bearings. Thus, the two bearings are provided with a better positioning effect.

In an example, the dustproof member includes a guiding portion on an annular outer edge thereof, and the guiding portion extends radially outward from the upper face to the lower face to form an inclined face. Thus, dust is difficult to adhere to the upper face of the dustproof member when the dustproof member is rotating, achieving a better dustproof effect.

In an example, the dustproof member includes a guiding portion on an annular outer edge thereof, and the guiding portion extends radially outward from the upper face to the lower face to form an arcuate face. Thus, dust is difficult to adhere to the upper face of the dustproof member when the dustproof member is rotating, achieving a better dustproof effect.

In an example, the dustproof member includes an annular wall extending from the annular outer edge thereof, and an inner periphery of the annular wall is spaced from an outer periphery of the shaft tube by a gap. Thus, dust is prevented from entering the shaft tube and is prevented from accumulating in the top portion of the at least one bearing, providing a better dustproof effect.

In an example, the shaft tube includes an outer wall having a reduced radial portion to form a reduced outer diameter. The annular wall has an inner periphery defining an inner diameter. The reduced outer diameter is slightly smaller than the inner diameter of the annular wall. Thus, a double-bend passageway is formed between the upper face of the dustproof member and the top portion of the at least one bearing to make dust more difficult to enter the shaft tube and to accumulate in the top portion of the at least one bearing, achieving the best dustproof effect.

In an example, the dustproof member and the rotating member are integrally formed. Thus, the upper face of the dustproof member can be coupled with the bottom of the shaft seat of the rotating member to provide a better engaging effect between the dustproof member and the rotating member.

In an example, the at least one bearing is an oily bearing. Thus, dust is also prevented from entering the oily bearing.

In an example, the shaft extending through the at least one bearing is positioned by a restraining member. Thus, the shaft is provided with a better restraining effect.

In an example, the second end of the shaft is rotatably supported by an abutting member. Thus, the shaft is provided with a more stable rotational effect.

In an example, the rotating member includes at least one heat dissipating hole extending therethrough. Thus, a better heat dissipating effect is provided while the rotating member is rotating.

In an example, wherein the casing includes at least one heat dissipating hole extending therethrough. Thus, a better heat dissipating effect is provided while the rotating member is rotating.

In an example, the rotating member further includes a housing fixed to an outer periphery of the casing. Thus, the rotating member has a better appearance.

In an example, the rotating member further includes at least one heat dissipating hole extending through the casing and the housing. Thus, a better heat dissipating effect is provided while the rotating member is rotating.

In an example, the housing is a hub of an impeller and includes a plurality of blades. Thus, the motor according to the present invention can form a heat dissipating fan.

The present invention will become clearer in light of the following detailed description of illustrative embodiments of this invention described in connection with the drawings.

DETAILED DESCRIPTION OF THE INVENTION

Figure 1:
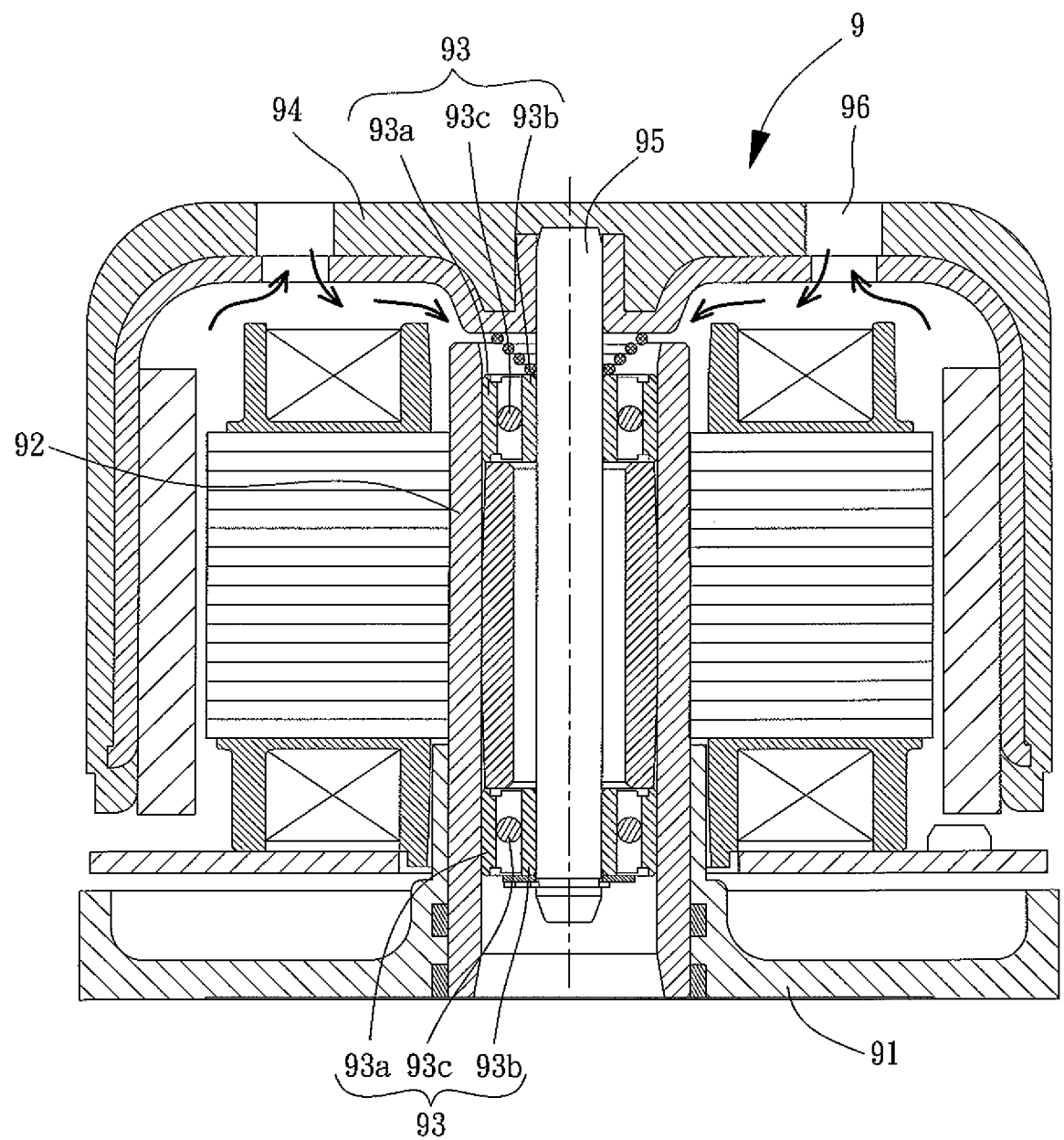
FIG. 1 is a cross sectional view of a conventional motor.
Figure 2:
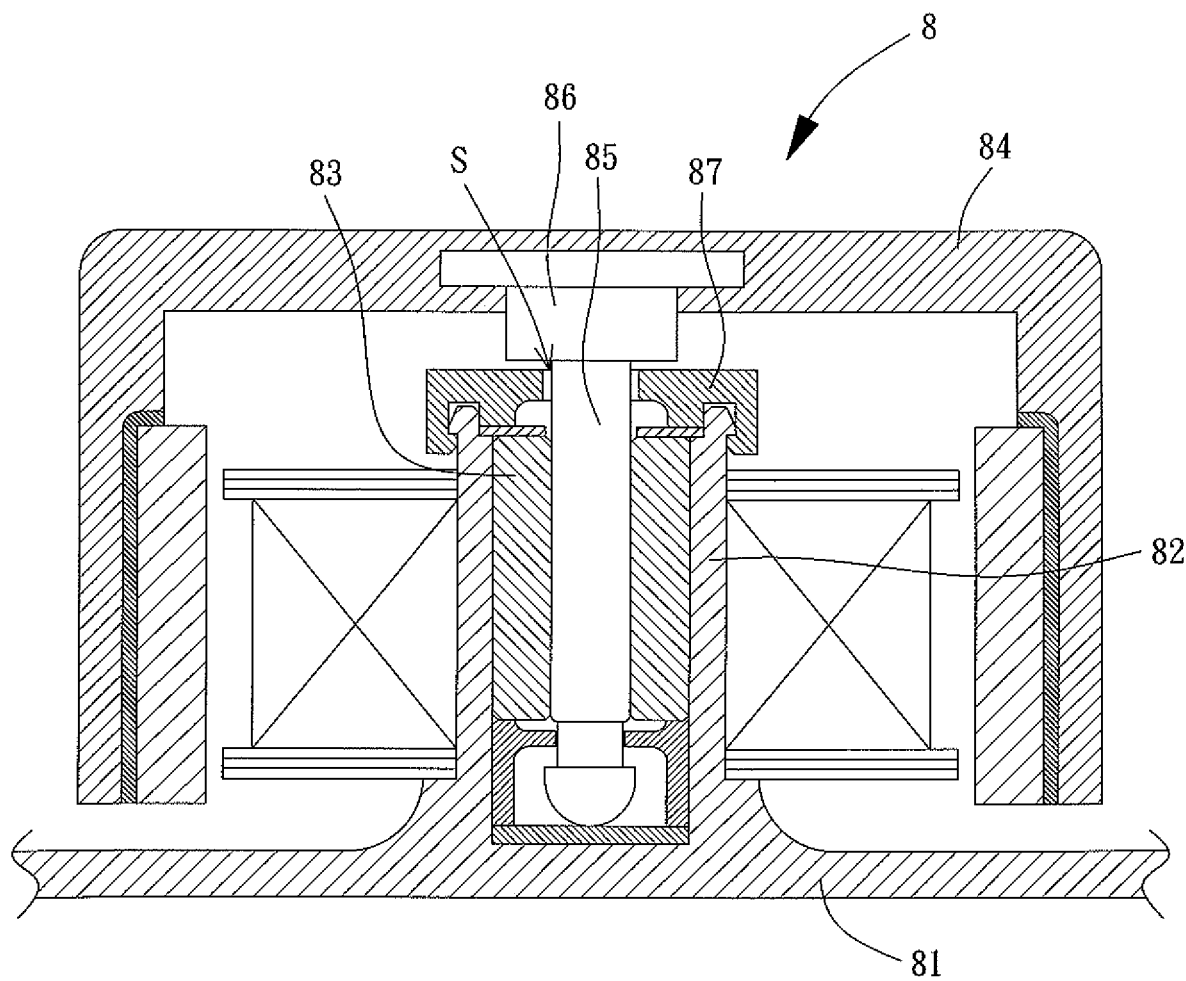
FIG. 2 is a cross sectional view of another conventional motor.
Figure 3:
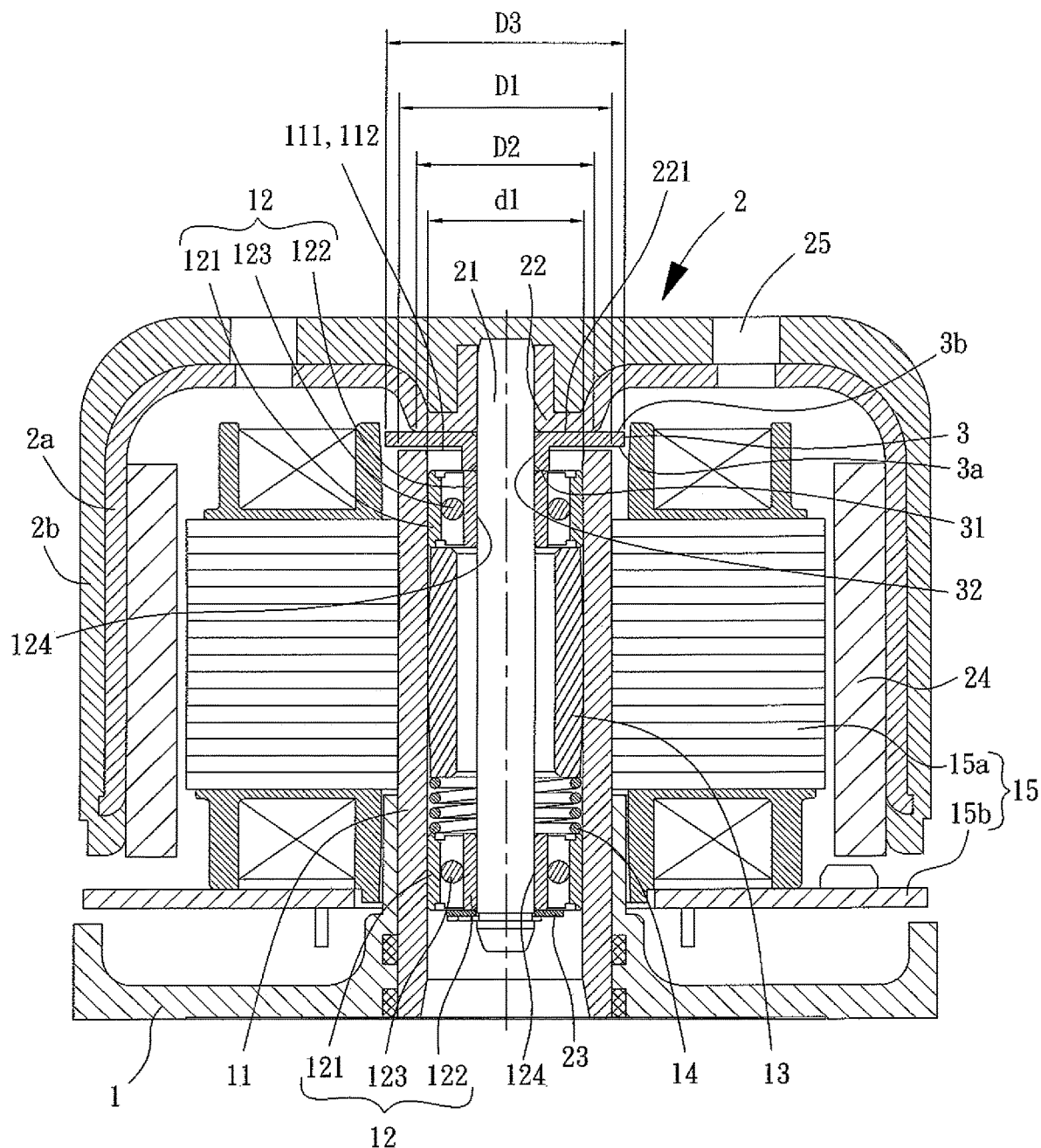
FIG. 3 is a cross sectional view of a motor including a first example of a dustproof member according to a first embodiment of the present invention.

FIG. 3 shows a motor including a first example of a dustproof member according to a first embodiment of the present invention. This example includes a base 1, a rotating member 2, and a dustproof member 3. The rotating member 2 includes a shaft 21 rotatably mounted to the base 1. The dustproof member 3 is coupled to and jointly rotatable with the shaft 21.

The base 1 includes a shaft tube 11 that is hollow. An end of the shaft tube 11 can be integrally formed with the base 1 or can be securely coupled to the base 1 by any suitable provision. The other end of the shaft tube 11 is an open end 111 preferably having circular cross sections. The open end 111 of the shaft tube 11 includes an opening 112. The open end 111 including the opening 112 has an outer diameter D1 and an inner diameter d1. At least one bearing 12 is coupled to an inner periphery of the shaft tube 11 and has a shaft-receiving hole 124. In this embodiment, two bearings 12 in the form of ball bearings 12 are provided. Each ball bearing 12 includes an outer race 121, an inner race 122, and a plurality of balls 123 between the outer race 121 and the inner race 122. Preferably, the two bearings 12 are spaced from each other and are positioned by any suitable provision to position the two bearings 12 to the inner periphery of the shaft tube 11. In this embodiment, a positioning ring 13 and an elastic element 14 are mounted between the two bearings 12. The positioning ring 13 includes an upper end abutting a bottom portion of the outer race 121 of an upper one of the two bearings 12. The elastic element 14 includes a first end abutting a bottom end of the positioning ring 13. The elastic element 14 further includes a second end abutting a top portion of the outer race 121 of a lower one of the two bearings 12. Thus, the two bearings 12 are spaced from each other. The base 1 further includes a stator unit 15 mounted around the shaft tube 11. The stator unit 15 can be a stator 15a or further includes a circuit board 15b. The stator 15a and the circuit board 15b are mounted around the shaft tube 11. Thus, the rotating member 2 is rotatably coupled to the base 1 to form a motor.

The rotating member 2 can be any rotatable member including, but not limited to, a rotor of a motor. The rotating member 2 includes a shaft seat 22. An end of the shaft 21 is coupled to the shaft seat 22, such as by integral formation. In another example shown in FIG. 3, the end of the shaft 21 is coupled to the shaft seat 22 formed on a casing 2a. The shaft seat 22 includes a bottom 221 that is preferably a circular plane. The bottom 221 of the shaft seat 22 has an outer diameter D2 larger than the inner diameter d1 of the shaft tube 11. In this embodiment, the shaft 21 extends through the shaft-receiving hole 124 of the at least one bearing 12. Furthermore, the shaft 21 and the inner periphery of the inner races 122 of the two bearings 12 are press fit together. Furthermore, a restraining member 23 is mounted around the shaft 21 and can be a C-clip or a retaining plate. The restraining member 23 abuts a bottom portion of the inner race 122 of the lower one of the two bearings 12. Thus, the rotating member 2 can rotate relative to the shaft tube 11 without the risk of disengagement. The rotating member 2 further includes a housing 2b and a permanent magnet 24. The housing 2b is fixed to an outer periphery of casing 2a. The housing 2b can be, but not limited to, a hub of a fan, and the hub can include a plurality of blades (not shown). The permanent magnet 24 is aligned with the stator unit 15 of the base 1. The rotating member 2 further includes at least one heat dissipating hole 25 extending through a wall at the top portion of the rotating member 2, or extending through the top portion of the casing 2a, or extending through the top portions of the casing 2a and the housing 2b. In this embodiment, the at least one heat dissipating hole 25 extends through the casing 2a and the housing 2b to form at least one vent.

Dustproof member 3 includes a lower face 3a and an upper face 3b. Dustproof member 3 is preferably in the form of a circular disk. The lower face 3a of the dustproof member 3 can cover the opening 112 of shaft tube 11 without contacting the opening 112 of the shaft tube 11. The dustproof member 3 includes an abutting portion 31 protruding from the lower face 3a. The abutting portion 31 extends into the shaft tube 11 and abuts the top portion of the at least one bearing 12. In this embodiment, the abutting portion 31 abuts the top portion of the inner race 122 of the upper one of the two bearings 12 to provide axial positioning of the dustproof member 3. The dustproof member 3 includes an engaging portion 32 having a shaft-receiving hole, such that the dustproof member 3 can be mounted around the shaft 21 by press fitting or any other conventional provisions. Thus, the dustproof member 3 and the shaft 21 rotate synchronously and have no gaps therebetween. The upper face 3b of the dustproof member 3 abuts the bottom 221 of the shaft seat 22 of the rotating member 2. The bottom 221 of the shaft seat 22 is preferably a circular plane and has an outer diameter D2. Thus, the coupling area of the upper face 3b of the dustproof member 3 and the bottom 221 of the shaft seat 22 is within the range of the outer diameter D2 of the bottom 221, such that the upper face 3b of the dustproof member 3 and the bottom portion 221 of the shaft seat 22 of the rotating member 2 have a contact type engagement therebetween. Alternatively, the dustproof member 3 and the rotating member 2 are integrally formed. Namely, the upper face 3b is formed on the bottom 221 of the shaft seat 22, which can be appreciated by one having ordinary skill in the art. By the coupling between the dustproof member 3 and the bottom 221 of the shaft seat 22, the motor drives the dustproof member 3 to rotate jointly, effectively preventing dust from entering the shaft tube 11 during rotation of the motor and avoiding shortening of the service life of the bearings 12.

The dustproof member 3 has an outer diameter D3 larger than the outer diameter D1 of the shaft tube 11, such that a projection of the dustproof member 3 is completely on top of the opening 112 of the shaft tube 11. Thus, the dustproof member 3 completely prevents dust from entering the opening 112 of the shaft tube 11 and prevents accumulation of dust in the top portion of the at least one bearing 12, achieving the best dustproof effect of the dustproof bearing assembly and the motor including the dustproof bearing assembly according to the present invention.

According to the above, since the dustproof member 3 is coupled to the shaft 21 by the engaging portion 32 without any gaps, since the upper face 3b of the dustproof member 3 abuts or is integrally formed with the bottom 221 of the shaft seat 22 of the rotating member 2, and since the outer diameter D3 of the dustproof member 3 is larger than the outer diameter D1 of the shaft tube 11, the opening 112 of the shaft tube 11 is completely covered by the dustproof member 3 to effectively prevent dust from entering the shaft tube 11 and to prevent accumulation of dust in the top portion of the at least one bearing 12. Thus, the present invention has a better dustproof effect to avoid non-smooth rotation of the at least one bearing 12 and the resultant rotational noise while prolonging the service life of the at least one bearing 12. Furthermore, since the outer diameter D2 of the bottom 221 of the shaft seat 22 is larger than the inner diameter d1 of the shaft tube 11, the abutting portion 31 of the dustproof member 3 can abut the inner race 122 of the upper one of the two bearings 12 to provide the bearing 12 with a better positioning effect.

Figure 4:
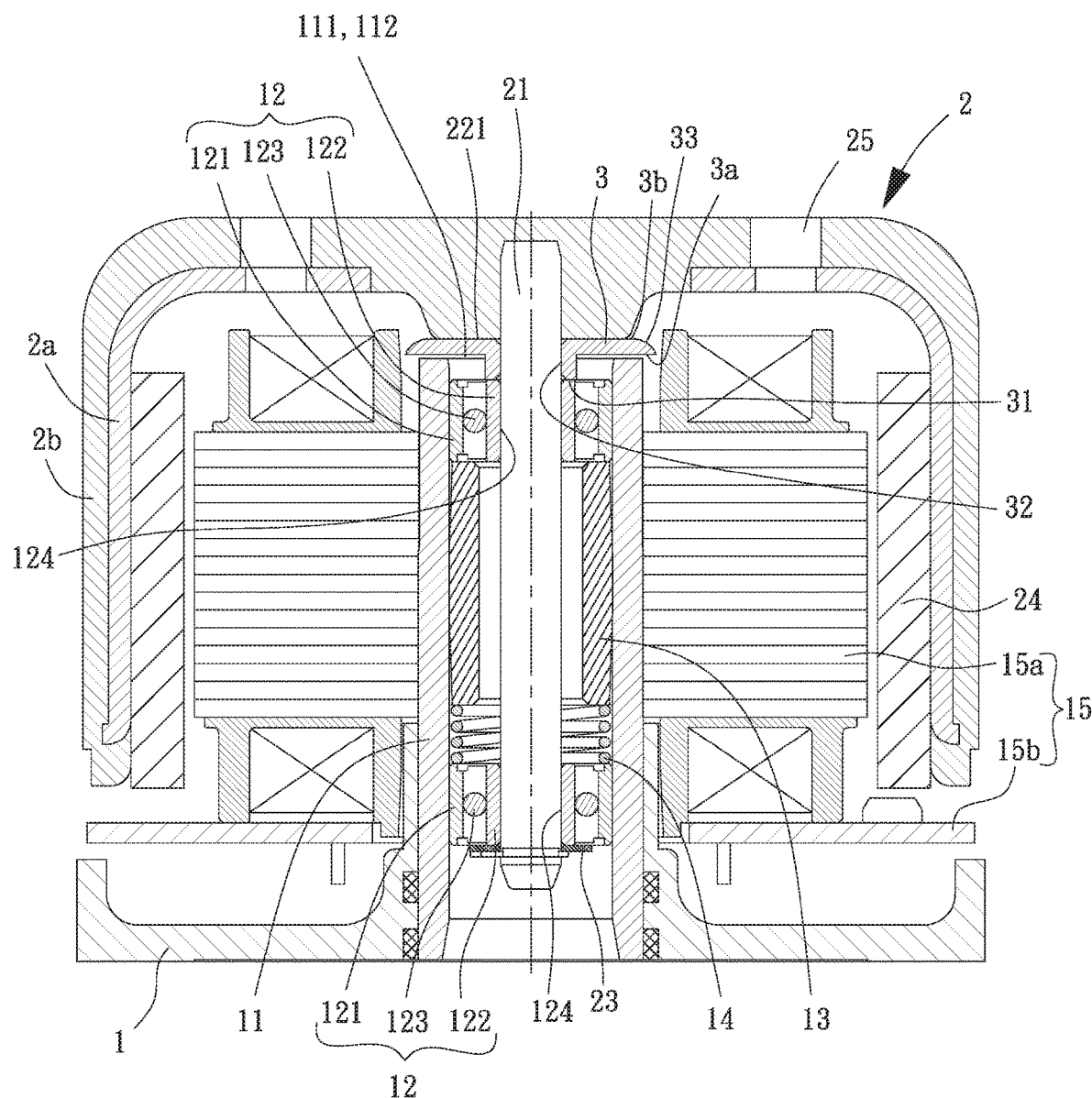
FIG. 4 is a cross sectional view of a motor including a second example of a dustproof member according to the first embodiment of the present invention.

FIG. 4 shows another example of the structure of the dustproof member 3. In comparison with the above example, the dustproof member 3 includes a guiding portion 33 on an annular outer edge thereof. The guiding portion 33 extends radially outward from the upper face 3b to the lower face 3a to form an inclined face or an arcuate face. Thus, when the dustproof member 3 rotates, dust is more difficult to adhere to the upper face 3b of the dustproof member 3, achieving a better dustproof effect.

Figure 5:
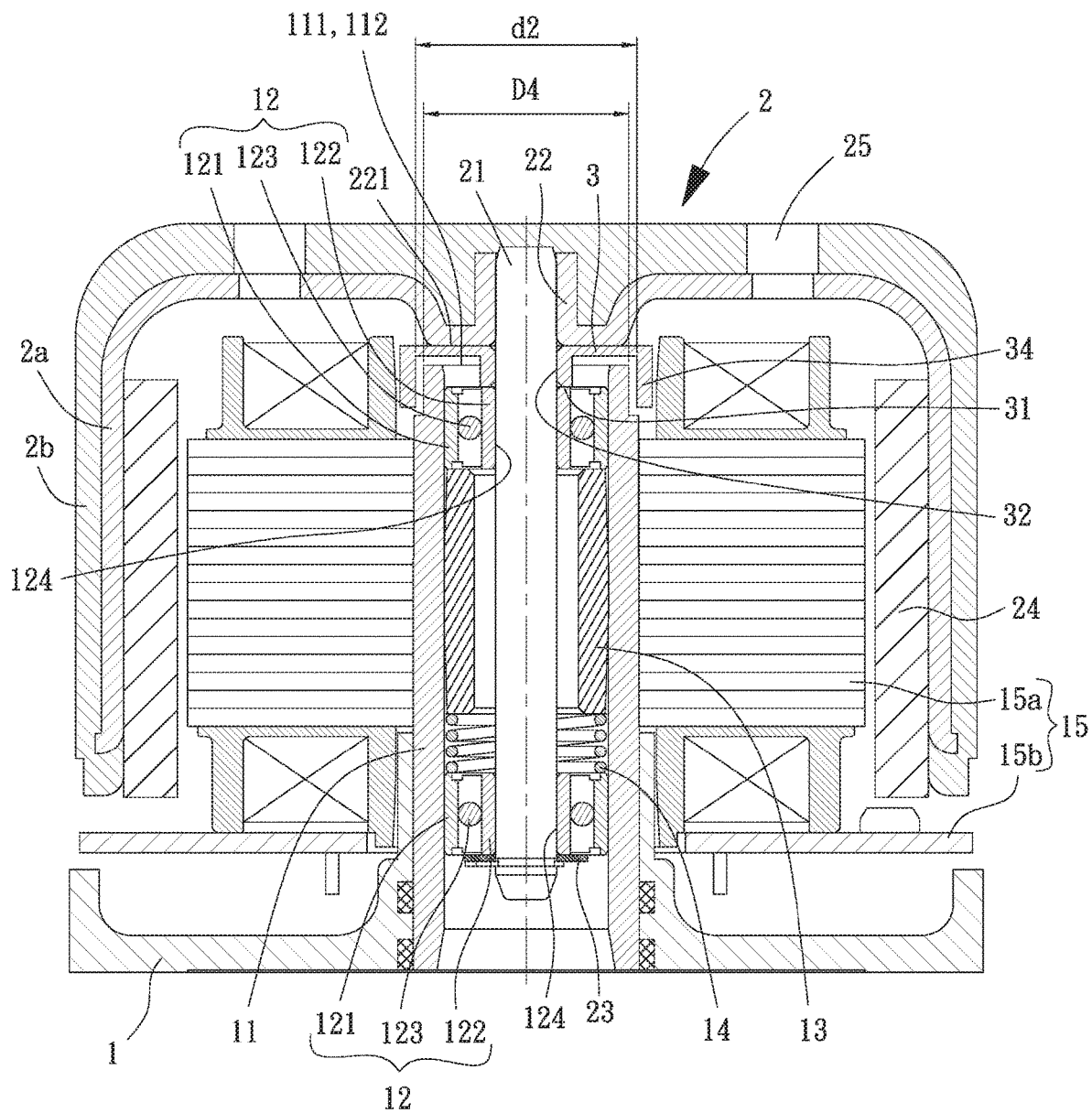
FIG. 5 is a cross sectional view of a motor including a third example of a dustproof member according to the first embodiment of the present invention.

FIG. 5 shows a further example of the structure of the dustproof member 3. In comparison with the above two examples, the dustproof member 3 includes an annular wall 34 extending from the annular outer edge thereof. The annular wall 34 surrounds a periphery of the lower face 3a of the dustproof member 3. The inner periphery of the annular wall 34 and the outer periphery of the shaft tube 11 are not in contact with each other and are spaced from each other by a suitable gap, such that the annular wall 34 does not contact with the shaft tube 11 when the dustproof member 3 rotates. If necessary, the outer wall of the shaft tube 11 includes a reduced radial portion to form a reduced outer diameter D4. The annular wall 34 has an inner periphery defining an inner diameter d2. The reduced outer diameter D4 is slightly smaller than the inner diameter d2 of the annular wall 34. Thus, the inner periphery of the annular wall 34 does not collide with the outer periphery of the shaft tube 11 when the dustproof member 3 rotates. Thus, a double-bend passageway is formed between the upper face 3b of the dustproof member 3 and the top portion of the at least one bearing 12 to make dust more difficult to enter the shaft tube 11 and to accumulate in the top portion of the at least one bearing 12, achieving the best dustproof effect.

Figure 6:
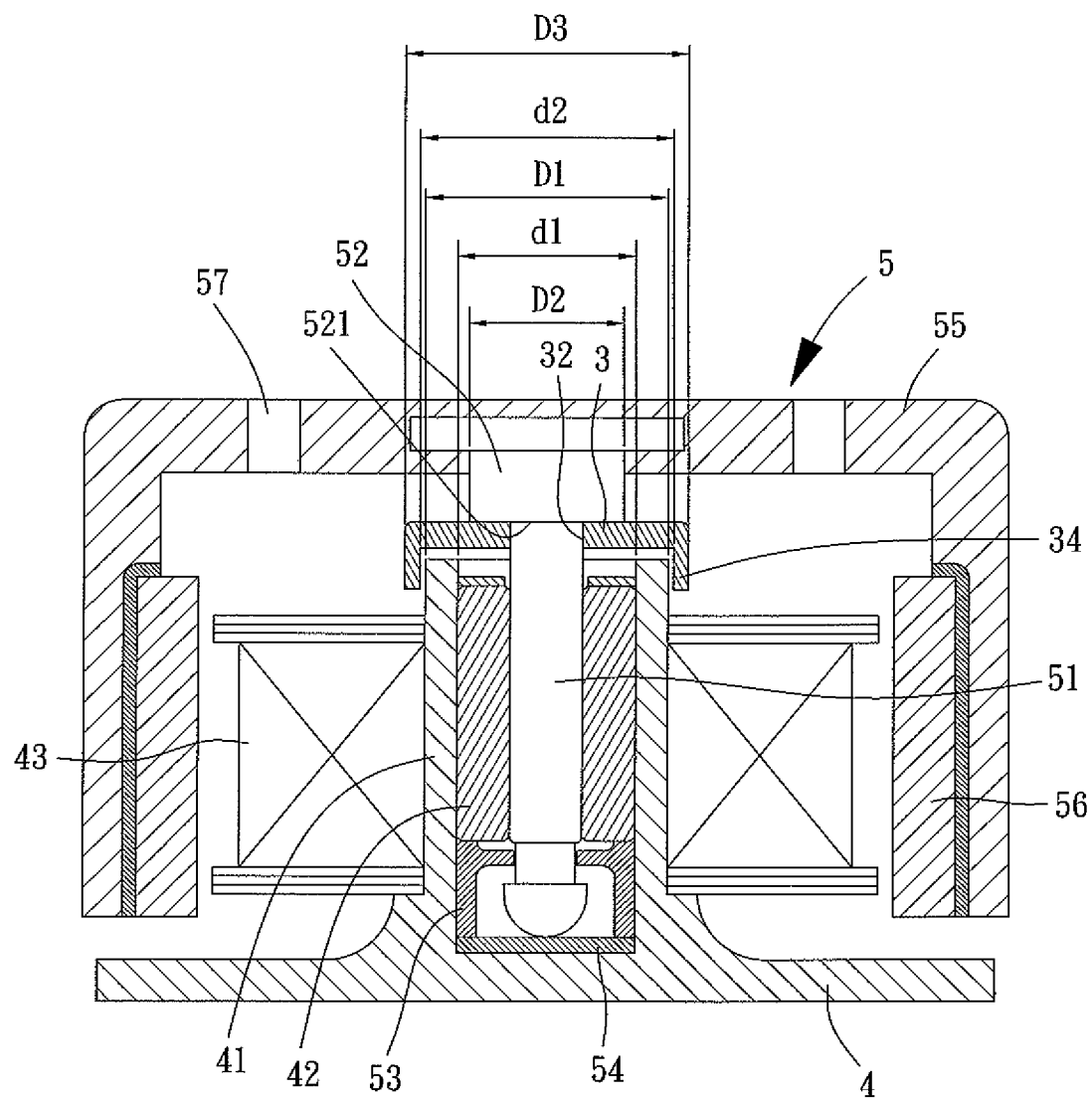
FIG. 6 is a cross sectional view of a motor including a dustproof member according to a second embodiment of the present invention.

FIG. 6 shows a motor including a dustproof member according to a second embodiment of the present invention. In comparison with the above embodiment, the second embodiment also includes a base 4, a rotating member 5, and a dustproof member 3. The base 4 and the rotating member 5 can be the same as the base 1 and the rotating member 2 of the first embodiment or have structures shown in FIG. 6. As shown in FIG. 6, the base 4 includes a shaft tube 41 having an opening with an outer diameter D1 and an inner diameter d1. A bearing 42 is mounted in the shaft tube 41 and can be an oily bearing. The base 4 can further include a coil unit 43. The rotating member 5 is rotatably coupled to the base 4 to form a motor.

The rotating member 5 can be any rotatable member including, but not limited to, a rotor of a motor. The rotating member 5 includes a shaft 51 having an end fixed to a shaft seat 52 by integral formation or coupling. A bottom 521 of the shaft seat 52 has an outer diameter D2. The shaft 51 extends through the bearing 42 and is restrained by a restraining member 53 including but not limited to of a conventional arrangement. Furthermore, the bottom end of the shaft 51 is rotatably supported by an abutting member 54. The rotating member 5 can further include a housing 55 and a permanent magnet 56. The housing 55 can be, but not limited to, a hub of a fan, and the hub can have a plurality of blades (not shown). The rotating member 5 further includes a last one heat dissipating hole 57 extending through a wall of the rotating member 5 to form at least one vent.

The dustproof member 3 can be the same as the above examples, such as in the form of a disk, including a guiding portion 33, or including an annular wall 34. In an example in FIG. 6, the dustproof member 3 has an outer diameter D3 larger than the outer diameter D1 of the shaft tube 41 at the opening. Alternatively, the inner diameter d2 of the annular wall 34 is larger than the outer diameter D1 of the shaft tube 41 at the opening or has a reduced outer diameter D4. Thus, the same effects of preventing dust from entering the opening of the shaft tube 41 and preventing accumulation of dust in the top portion of the at least one bearing 42 are achieved, which can be appreciated by one having ordinary skill in the art. Furthermore, the dustproof member 3 can be press fit around the shaft 51.

In view of the foregoing, in the dustproof bearing assembly and the motor including the dustproof bearing assembly according to the present invention, since the dustproof member is coupled by the engaging portion to the shaft without any gaps, since the upper face of the dustproof member abuts or is integrally formed with the bottom of the shaft seat of the rotating member, and since the outer diameter of the dustproof member is larger than the outer diameter of the shaft tube, the opening of the shaft tube is completely covered by the dustproof member to effectively prevent dust from entering the shaft tube and to prevent accumulation of dust in the top portion of the at least one bearing. Thus, the present invention has a better dustproof effect to avoid non-smooth rotation of the at least one bearing and the resultant rotational noise while prolonging the service life of the at least one bearing. Furthermore, since the outer diameter of the bottom of the shaft seat is larger than the inner diameter of the shaft tube, the abutting portion of the dustproof member can abut the inner race of the upper one of the two bearings to provide the bearing with a better positioning effect.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A dustproof bearing assembly, comprising:
    a base including a shaft tube having an open end with an opening, wherein the open end including the opening has an outer diameter and an inner diameter, and wherein at least one bearing is coupled to an inner periphery of the shaft tube and has a shaft-receiving hole;
    a rotating member including a shaft seat having a bottom, wherein a shaft includes a first end coupled to the shaft seat and a second end extending through the shaft-receiving hole of the at least one bearing, wherein the bottom of the shaft seat has an outer diameter; and
    a dustproof member including a lower face and an upper face, wherein the lower face is spaced from the open end of the shaft tube, wherein the dustproof member covers the opening, wherein the upper face of the dustproof member abuts the bottom of the shaft seat, and wherein the dustproof member has an outer diameter larger than the inner diameter of the shaft tube, as well as the outer diameter of the bottom of the shaft seat.

2. The dustproof bearing assembly as claimed in claim 1, wherein the at least one bearing includes at least one ball bearing having an outer race and an inner race.

3. The dustproof bearing assembly as claimed in claim 2, wherein the at least one bearing includes two bearings securely positioned to the inner periphery of the shaft tube and spaced from each other.

4. The dustproof bearing assembly as claimed in claim 3, wherein a positioning ring and an elastic element are mounted between the two bearings, wherein the positioning ring includes an upper end abutting a bottom portion of the outer race of an upper one of the two bearings, as well as a bottom end, wherein the elastic element includes a first end abutting the bottom end of the positioning ring, and wherein the elastic element further includes a second end abutting a top portion of the outer race of a lower one of the two bearings.

5. The dustproof bearing assembly as claimed in claim 4, wherein a restraining member is mounted around the shaft and abuts a bottom portion of the inner race of the lower one of the two bearings.

6. The dustproof bearing assembly as claimed in claim 2, wherein the dustproof member includes an abutting portion protruding from the lower face, and wherein the abutting portion abuts the top portion of the inner race of the at least one bearing.

7. The dustproof bearing assembly as claimed in claim 3, wherein the dustproof member includes an abutting portion protruding from the lower face, and wherein the abutting portion abuts the top portion of the inner race of the upper one of the two bearings.

8. The dustproof bearing assembly as claimed in claim 1, wherein the rotating member includes a casing, and wherein the shaft seat is formed on the casing.

9. The dustproof bearing assembly as claimed in claim 8, wherein the casing includes at least one heat dissipating hole extending therethrough.

10. The dustproof bearing assembly as claimed in claim 9, wherein the rotating member further includes a housing fixed to the casing, and wherein the at least one heat dissipating hole extends through the casing and the housing.

11. The dustproof bearing assembly as claimed in claim 1, wherein the bottom of the shaft seat has an outer diameter larger than the inner diameter of the shaft tube.

12. The dustproof bearing assembly as claimed in claim 1, wherein the dustproof member includes a guiding portion on an annular outer edge thereof, and wherein the guiding portion extends radially outward from the upper face to the lower face to form an inclined face.

13. The dustproof bearing assembly as claimed in claim 1, wherein the dustproof member includes a guiding portion on an annular outer edge thereof, and wherein the guiding portion extends radially outward from the upper face to the lower face to form an arcuate face.

14. The dustproof bearing assembly as claimed in claim 1, wherein the dustproof member includes an annular wall extending from an annular outer edge thereof, and wherein an inner periphery of the annular wall is spaced from an outer periphery of the shaft tube by a gap.

15. The dustproof bearing assembly as claimed in claim 14, wherein the shaft tube includes an outer wall having a reduced radial portion to form a reduced outer diameter, wherein the annular wall has an inner periphery defining an inner diameter, and wherein the reduced outer diameter is slightly smaller than the inner diameter of the annular wall.

16. The dustproof bearing assembly as claimed in claim 1, wherein the dustproof member and the rotating member are integrally formed to couple the upper face of the dustproof member with the bottom of the shaft seat of the rotating member.

17. The dustproof bearing assembly as claimed in claim 1, wherein the at least one bearing is an oily bearing.

18. The dustproof bearing assembly as claimed in claim 17, further comprising a restraining member, wherein the shaft extending through the at least one bearing is positioned by the restraining member.

19. The dustproof bearing assembly as claimed in claim 17, further comprising an abutting member, wherein the second end of the shaft is rotatably supported by the abutting member.

20. The dustproof bearing assembly as claimed in claim 1, wherein the bottom of the shaft seat is planar.

21. The dustproof bearing assembly as claimed in claim 1, wherein the dustproof member includes an engaging portion press fit around the shaft.

22. The dustproof bearing assembly as claimed in claim 1, wherein the dustproof member has an outer diameter larger than the outer diameter of the shaft tube.

23. A motor, comprising:
a base including a shaft tube having an open end with an opening, wherein the open end including the opening has an outer diameter and an inner diameter, wherein at least one bearing is coupled to an inner periphery of the shaft tube and has a shaft-receiving hole, and wherein a stator unit is mounted around the shaft tube;
a rotating member including a shaft seat and a permanent magnet, wherein the shaft seat includes a bottom, wherein the bottom of the shaft seat has an outer diameter, wherein a shaft includes a first end coupled to the shaft seat and a second end extending through the shaft-receiving hole of the at least one bearing, and wherein the permanent magnet is aligned with the stator unit; and
a dustproof member including a lower face and an upper face, wherein the lower face is spaced from the open end of the shaft tube, wherein the dustproof member covers the opening, wherein the upper face of the dustproof member abuts the bottom of the shaft seat, and wherein the dustproof member has an outer diameter larger than the inner diameter of the shaft tube, as well as the outer diameter of the bottom of the shaft seat.

24. The motor as claimed in claim 23, wherein the rotating member includes a casing, and wherein the shaft seat is formed on the casing.

25. The motor as claimed in claim 24, wherein the casing includes at least one heat dissipating hole extending therethrough.

26. The motor as claimed in claim 23, wherein the rotating member includes at least one heat dissipating hole extending therethrough.

27. The motor as claimed in claim 23, wherein the rotating member further includes a housing fixed to an outer periphery of the casing.

28. The motor as claimed in claim 27, wherein the rotating member further includes at least one heat dissipating hole extending through the casing and the housing.

29. The motor as claimed in claim 27, wherein the housing is a hub of an impeller and includes a plurality of blades.

30. The motor as claimed in claim 23, wherein the bottom of the shaft seat is planar.

31. The motor as claimed in claim 23, wherein the dustproof member includes an engaging portion coupled to the shaft.

32. The motor as claimed in claim 31, wherein the engaging portion is press fit around the shaft.

33. The motor as claimed in claim 23, wherein the dustproof member has an outer diameter larger than the outer diameter of the shaft tube.

* * * * *